J. C. REIFSNIDER.
AUTOMOBILE TIRE.
APPLICATION FILED JUNE 24, 1915.

1,189,485.

Patented July 4, 1916.

WITNESSES:
A. B. Cornelius
Horace Barnes

INVENTOR
James C. Reifsnider
BY
Pierre Barnes
ATTORNEY

UNITED STATES PATENT OFFICE.

JAMES C. REIFSNIDER, OF SEATTLE, WASHINGTON.

AUTOMOBILE-TIRE.

1,189,485.  Specification of Letters Patent.  Patented July 4, 1916.

Application filed June 24, 1915. Serial No. 36,003.

*To all whom it may concern:*

Be it known that I, JAMES C. REIFSNIDER, a citizen of the United States, residing at Seattle, in the county of King and State of Washington, have invented certain new and useful Improvements in Automobile-Tires, of which the following is a specification.

This invention relates to improvements in resilient tires, and has for its object the provision of a tire casing of simple and novel construction particularly adapted for use with an inner annular distending ring, such as is shown and described in the patent application of Alvin H. Shoemaker, Serial No. 838,998.

The invention consists in the novel construction and arrangement of a tire casing, and its combination with a distending ring, as aforesaid, as will be fully described in the following specifications, illustrated in the accompanying drawings, and finally set forth in the appended claims.

Figure 1:
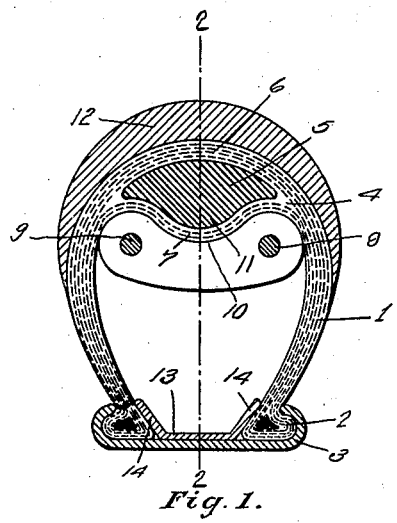
Figure 2:
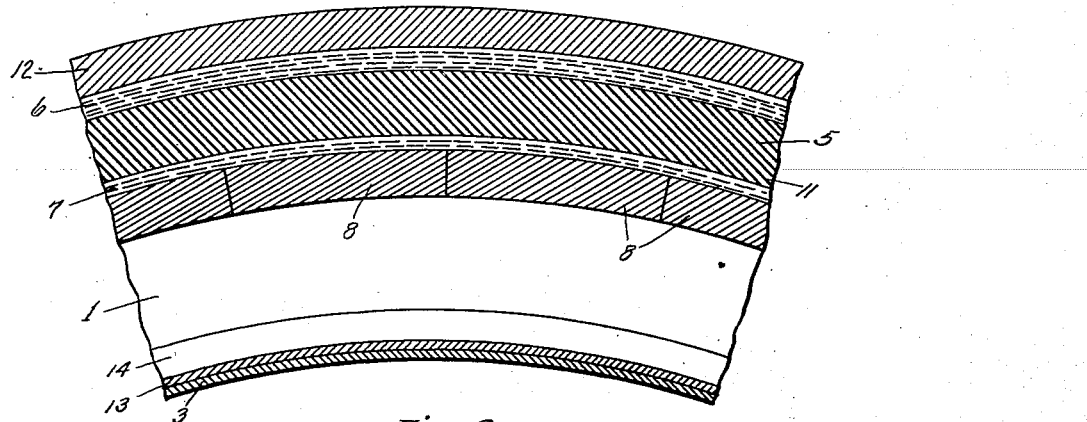

In said drawings, Figure 1 is a view in cross-section of a tire embodying my invention. Fig. 2 is a fragmentary longitudinal section of the same taken on line 2—2 of Fig. 1.

Referring to said views the reference numeral 1 represents the side walls of a tire casing, terminating at their inner edges in rim-beads 2 of ordinary or suitable form to be retained by a wheel-rim 3. Said side walls are composed of a plurality of plies of fabric which are divided as at 4, in proximity of the outer tread portion of the tire for the reception of a body of cushion material 5, such as rubber, between the outer plies 6 and the inner plies 7. Said cushion material is desirably of symmetrical configuration with respect to an axial line vertical to the line of tread, as for example the line 2—2 of Fig. 1, and of form in cross-section to correspond with the configuration of the outermost surfaces of the distending ring. Such ring is composed of jointed members 8 abutted and provided with interfitting devices 9 at their opposite ends. Such members are made of inverted arch construction and hence are formed with a central longitudinally disposed depression 10 to which the cushion 5 is adapted to conform through an inwardly directed central protrusion 11. Said protrusion does not bear directly upon the members 8 as the casing plies 7 are interposed therebetween and safeguard the relatively softer cushion body from damage and wear from the ring.

The casing is provided with a tread 12 of usual construction and as it is not intended to be inflated, is provided with a retaining ring 13 having lateral inclined wings 14 upon each side adapted to engage the inner side of the beads 2 and press them outwardly against the rim 3. Said retaining ring is formed with a contractible joint, (not shown) whereby it may be reduced in diameter and caused to bear with pressure against the casing-beads, as shown.

The advantages of my improved tire will be readily apparent, particularly in connection with a tire distending device referred to. The manner in which the cushion is embedded within the casing fabric and protected thereby is an extremely advantageous construction.

Having described my invention, what I claim is:—

1. In a tire of the class described, in combination with a tire distending ring composed of a plurality of abutted rigid members of inverted arch construction affording a continuous outwardly disposed channel, of a tire casing therefor having a body of cushion material secured therein, said body affording an inwardly directed protrusion corresponding to and adapted to be retained within said channel.

2. In a tire of the class described, in combination with a tire-distending ring composed of a plurality of articulated members of inverted arch construction affording a central longitudinally disposed depression, of a tire casing therefor having a body of cushion material secured therein, said body affording an inward annular protrusion corresponding to and adapted to be retained within said depression, the side walls of said casing being formed of a plurality of plies of fabric the outer portions of which are positioned upon the inner and outer surfaces, respectively, of said cushion.

3. In a tire of the class described, in combination, a flexible casing and a distending ring therefor, composed of a plurality of abutted rigid members severally formed with outwardly inclined side portions to afford a continuous external channel, said casing being formed with a continuous body of cushion material extending inwardly and disposed to interfit with said channel.

Signed at Seattle, this 19th day of June, 1915.

JAMES C. REIFSNIDER.

Witnesses:
HORACE BARNES,
PIERRE BARNES.